Dec. 2, 1947.  D. H. MURPH  2,431,821
FISHHOOK MOUNTING
Filed Dec. 11, 1944
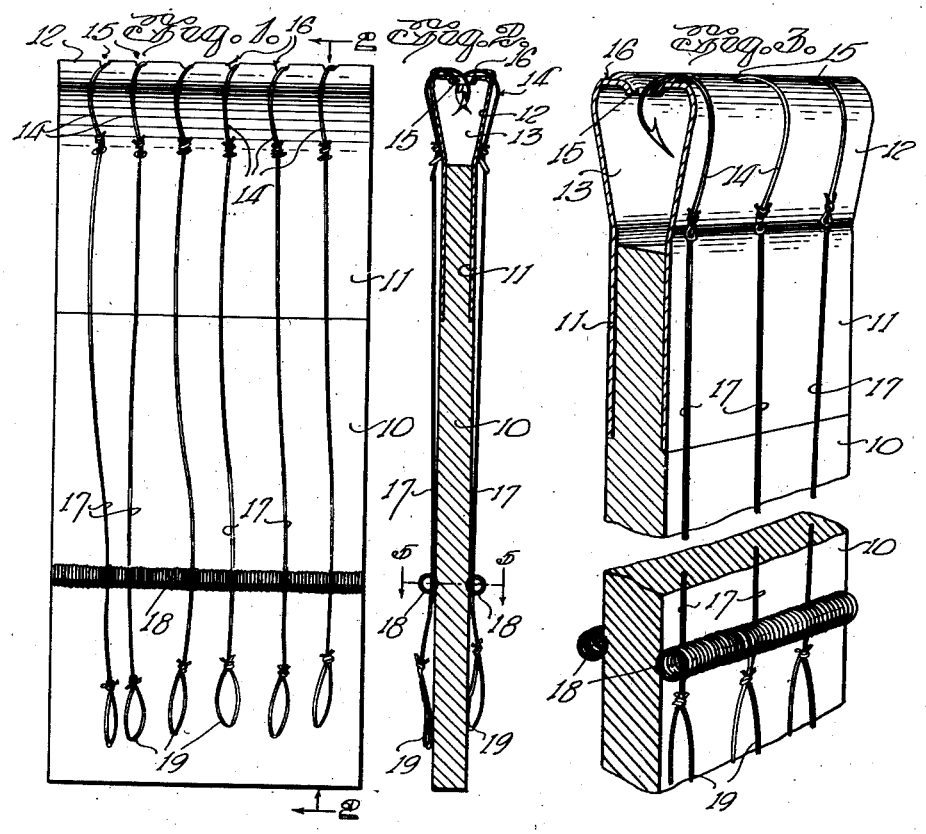
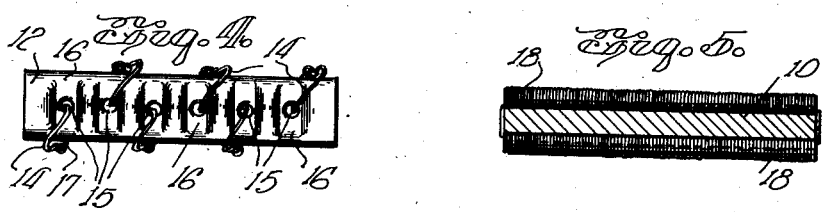
DONALD H. MURPH
INVENTOR.
BY
ATTORNEY Patented Dec. 2, 1947

2,431,821

UNITED STATES PATENT OFFICE 2,431,821

FISHHOOK MOUNTING

Donald H. Murph, Dallas, Tex.

Application December 11, 1944, Serial No. 567,753

1 Claim. (Cl. 43—32)

This invention relates to fishermen's supplies and equipment and it has particular reference to a holder or mounting for fish hooks.

The principal object of the invention is to provide a compact and economical device so constructed and arranged that a group of fish hooks may be mounted thereon quickly and as quickly removed for use, thereby affording a highly useful medium for keeping the hooks and leaders in an orderly manner and preventing entanglement thereof with other equipment or becoming caught in the clothing.

With the foregoing objects as paramount, the invention has further reference to certain features of accomplishment which will become apparent as the description proceeds, taken in connection with the accompanying drawings wherein:

Figure 1 is a side elevational view of a fish hook mounting constructed according to the present invention.

Figure 2 is a vertical sectional view on line 2—2 on Figure 1.

Figure 3 is a fragmentary perspective view in vertical section.

Figure 4 is a top plan view.

Figure 5 is a transverse sectional view taken on line 5—5 on Figure 2.

Continuing with a more detailed description of the drawing, reference is made to Figures 1 to 5, inclusive, wherein numeral 10 denotes a plate of any desirable material or dimensions to one end of which is affixed a hook retaining member 11, equal in width to that of the mounting plate 10 and bent into a substantially U-shape with the parallel portions lying one on each side of the plate 10. The curved end 12 of the member 11 extends slightly beyond the end of the plate 10 to define a space 13 between the walls of the member to receive the barbs of fish hooks 14.

Along the crest of the curved end 12 of the hook retaining member 11, relatively spaced apertures 15 are provided to receive the hooks 14, which are more accessibly mounted by arranging them on alternate sides of the device, as clearly shown in Figure 4.

The hooks 14 are readily released from the apertures 15 by pressing them inwardly so that the outer surface of the hook will bear against the side of the aperture opposite the hook so that the barb thereof will escape the near side of the aperture when the hook is lifted upwardly with a movement simultaneous with the forward movement thereof. To facilitate insertion and removal of the hooks as described, the sides of the member 11 are made to converge from the curved end thereof to a point in alignment with the upper end of the mounting plate 10. By so forming the walls of the retaining member, the hooks are not only easier to attach and detach but the shanks thereof are in better conformity therewith and tend to lie flat against the said walls, to be less likely to become engaged with adjacent objects.

It is preferred, in forming the head 12 of the member 11, that the crest thereof be flattened slightly and provided with transverse countersunk depressions 16 across the apertures 15 to keep the hooks separated from each other. To secure the leaders or snells 17 of the hooks for ready detachment of the hooks from the mounting, a closely coiled spring 18 is secured transversely across the plate at a point spaced from the lower end thereof on each side of the plate. The coils 18 lie in transverse grooves on each side of the plate as represented by dotted lines a in Figure 5 and the ends b of the wire forming the coils are joined across the sides of the plate 10. The position of these springs, of course, is determined by the length of the leaders 17 and it is desirable that the coils of the spring engage the leaders near their looped ends 19 to maintain reasonable tension thereon.

In mounting a hook on the device, it requires but the simple operation of first inserting the barb of the hook into a selected hole 15 of the head 12 and thrusting the leader 17 between the coils of the spring 18 lying on the side of the plate on which the shank of the hook rests. A slight pull on the end of the leader will place slight tension on the same and the spring will grip the leader with pressure sufficient to hold the leader and consequently the hook in place on the mounting until they are removed by simply lifting the leader out of engagement with the spring and raising the hook with a forward thrust, to remove it from the aperture.

Manifestly, the construction as shown and described is capable of some modification and such modification as may be construed to fall within the scope and meaning of the appended claim is also considered to be within the spirit and intent of the invention.

What is claimed is:

As a new article of manufacture, a holder for fish hooks including a flat, elongated body, a substantially U-shaped member whose parallel portions embrace one end of said body, the crest of said U-shaped member having a plurality of countersunk holes defining independent fish hook receptacles, coil springs disposed transversely across each side of said body intermediate the ends thereof for receiving and tensionally holding the leaders of fish hooks retained in said receptacles and means for securing said coil springs on said body.

DONALD H. MURPH.

REFERENCES CITED

The following references are of record in the file of this patent:

UNITED STATES PATENTS

| Number | Name | Date |
| --- | --- | --- |
| 1,934,748 | Swanberg | Nov. 14, 1933 |
| 1,807,346 | Schneggenburger | May 26, 1931 |
| 1,577,566 | Cryder | Mar. 23, 1926 |
| 502,427 | Zangenberg | Aug. 1, 1893 |
| 392,959 | Levison | Nov. 13, 1888 |
| 333,384 | Bray | Dec. 29, 1885 |